United States Patent [19]
Paul et al.

[11] Patent Number: 5,882,288
[45] Date of Patent: Mar. 16, 1999

[54] APPARATUS AND METHOD FOR FORMING SPIRAL PLEATED FILTER CARTRIDGES

[75] Inventors: C. Thomas Paul, Madison, Conn.; John A. Corey, Melrose, N.Y.

[73] Assignee: Cuno Incorporated, Meriden, Conn.

[21] Appl. No.: 8,256

[22] Filed: Jan. 16, 1998

Related U.S. Application Data

[60] Provisional application No. 60/034,964 Jan. 20, 1997.
[51] Int. Cl.⁶ ....................................................... B31D 5/04
[52] U.S. Cl. .......................... 493/379; 493/451; 493/409; 493/941; 210/493.4
[58] Field of Search ..................................... 493/941, 463, 493/457, 451, 409, 405; 55/520, DIG. 5; 210/493.4, 493.1, 493.5, 493.2, 494.1

[56] References Cited

U.S. PATENT DOCUMENTS

| | | |
|---|---|---|
| 2,395,449 | 2/1946 | Briggs . |
| 2,401,222 | 5/1946 | Briggs . |
| 2,537,992 | 1/1951 | Gross et al. . |
| 2,586,078 | 2/1952 | O'Malley . |
| 2,689,652 | 9/1954 | Gretzinger . |
| 2,801,009 | 7/1957 | Bowers . |
| 4,154,688 | 5/1979 | Pall . |
| 4,252,591 | 2/1981 | Rosenberg . |
| 4,564,376 | 1/1986 | Billiet . |
| 5,403,482 | 4/1995 | Steere et al. . |
| 5,472,606 | 12/1995 | Steere et al. . |
| 5,543,047 | 8/1996 | Stoyell et al. . |
| 5,591,338 | 1/1997 | Pruette et al. . |
| 5,690,765 | 11/1997 | Stoyell et al. . |

FOREIGN PATENT DOCUMENTS

| | | |
|---|---|---|
| 527620 | 7/1956 | Canada . |
| 649680 | 10/1962 | Canada . |
| 2305128 B2 | 6/1977 | Germany . |
| 764254 | 12/1956 | United Kingdom . |
| 823648 | 11/1959 | United Kingdom . |
| WO 94/11082 A1 | 5/1994 | WIPO . |
| WO 96/36415 | 11/1996 | WIPO . |

OTHER PUBLICATIONS

PCT International Search Report dated 5 Jun. 1998 with Annex.

Primary Examiner—James F. Coan
Assistant Examiner—Steven Jensen
Attorney, Agent, or Firm—Cummings & Lockwood

[57] ABSTRACT

A method is disclosed for forming a filter cartridge which includes the steps of providing a cylindrical filter element having a plurality of radially extending longitudinal pleats, engaging an outer periphery of the cylindrical filter element along a substantial portion of the length thereof, and simultaneously moving the plurality of radially extending longitudinal pleats into a laid-over spiraled configuration along the entire length of the cylindrical filter element to form a spiral pleated filter element. An apparatus is also disclosed for effectuating the disclosed method.

17 Claims, 10 Drawing Sheets

FIG_1

FIG_5

FIG_7

APPARATUS AND METHOD FOR FORMING SPIRAL PLEATED FILTER CARTRIDGES

CROSS-REFERENCE TO RELATED APPLICATIONS

The subject application claims priority to U.S. Provisional application Ser. No. 60/034,964 which was filed on Jan. 20, 1997.

BACKGROUND OF THE INVENTION

1. Field of the Invention

The subject invention is related to fluid filtration devices, and more particularly, to an apparatus and method for forming a spiral pleated filter cartridge.

2. Background of the Related Art

Cylindrical filter elements having radially extending longitudinal pleats are well known in the art and have been employed for many years to filter a wide range of fluids. Typically, because of the radial geometry of the pleats, there is a significant degree of spacing between adjacent pleat surfaces. Spiral pleated filter elements, which are also well known in the art, are designed so that adjacent pleats are laid-over upon one another so as to more effectively occupy the spacing between adjacent pleat surfaces, and thereby utilize more of the surface area of the filter material. Early examples of spiral pleated filters are disclosed in U.S. Pat. Nos. 2,395,449, 2,401,222 and 2,420,414 to Briggs and U.S. Pat. No. 2,801,001 to Bowers.

A more recent example of a spiral pleated filter element having laid-over pleats is disclosed in U.S. Pat. Nos. 5,543,047 and 5,690,765 to Stoyell et al. the disclosures of which are herein incorporated by reference in their entireties. The Stoyell et al. filter element comprises a three-layer composite of a filter medium, an upstream drainage layer disposed on the upstream surface of the filter medium, and a downstream drainage layer disposed on the downstream surface of the filter medium. The drainage layers are in the form of an extruded polymeric mesh oriented and configured so that opposing surfaces of adjacent pleats are in intimate contact with one another over a substantial portion of the length of the filter element.

The Stoyell et al. patents also disclose a method of forming a cylindrical filter element having radially extending pleats into a filter element having a plurality of laid-over pleats by placing the filter element over a cylindrical core disposed on a chuck, and thereafter placing a tubular member having an inner diameter which corresponds to the desired outer diameter of the laid-over filter element on the upper end of the filter element and pressing it downwards. As the tubular member moves downward, the pleats of the filter element are progressively laid-over against one another. When the entire length of the tubular member has been fit over the filter element, the tubular member, the core and the filter element are removed from the chuck and disposed on a second chuck. A cylindrical cage having an inner diameter corresponding to the desired outer diameter of the laid-over filter element is then placed on top of the tubular member and pressed downward until it completely displaces the tubular member from the filter element. The assembly, comprising the core, the laid over filter element and the cage are then removed from the second chuck and end caps are installed on both ends thereof.

The method disclosed in the Stoyell et al. patents is extremely labor intensive and the filters formed thereby are subject to random imperfections caused by manual misalignment of the various elements of the assembly. Accordingly, there is a need in the art to provide an apparatus and method for more efficiently and precisely forming a spiral pleated filter element.

SUMMARY OF THE INVENTION

A filter cartridge formed in accordance with a preferred embodiment of the subject invention includes a generally cylindrical filter element having a plurality of longitudinally extending pleats which are laid-over one another to form a spiral pleat pattern along the entire length of the filter element. Preferably, the filter element is a three-layer composite structure which consists of an upstream drainage layer, an interior filtration layer, and a downstream drainage layer. The filtration layer consists of one or more porous sheets of material having a uniform thickness, and at least one of the drainage layers consist of an extruded polymeric mesh material of the type commonly referred to as a "non-symmetric" mesh. The specific material contemplated is Delnet® polymeric mesh. Non-symmetric meshes (also known as asymmetric meshes), such as Delnet® polymeric mesh, are formed with a predominant set of spaced apart strands extending in the machine direction of the mesh.

In the spiral pleated filter of the subject invention, the predominant set of strands of the mesh on either the upstream or downstream drainage layer, or both, faces outwardly from the surface of the interior filtration layer. By orienting the predominant strands of a drainage layer in such a manner, when the filtration element is pleated and set in a laid-over state, the predominant strands on opposing pleats will nest with one another forming a series of parallel drainage channels extending perpendicular to the longitudinal axis of the filter cartridge.

The subject invention discloses a unique method for forming the spiral pleated filter element described hereinabove which comprises the steps of providing a cylindrical filter element having a plurality of radially extending longitudinal pleats, engaging an outer periphery of the cylindrical filter element along a substantial portion of the length thereof, and simultaneously moving the plurality of radially extending longitudinal pleats into a laid-over spiraled configuration along the entire length of the cylindrical filter element to form a spiral pleated filter element. Alternatively, the method comprises the steps of providing a cylindrical filter element having an initial outer diameter, engaging an outer periphery of the cylindrical filter element along a substantial portion of the length thereof, and simultaneously reducing the outer diameter of the cylindrical filter element along the entire length thereof.

The subject invention also discloses an automated apparatus for forming the spiral pleated filter element described hereinabove. The apparatus includes an assembly including a plurality of pneumatically actuated circumferentially disposed engagement members each having a respective arcuate engagement flange for engaging the outer periphery of a cylindrical pleated filter element along a substantial portion of the length thereof. The engagement members are mounted in such a manner so that when actuated, the engagement flanges simultaneously move along inwardly curved involute paths, thereby reducing the outer diameter of the cylindrical pleated filter element and urging the radially extending pleats into a laid-over spiraled configuration.

In a preferred embodiment of the subject invention, a ram piston is disposed below and in axial alignment with the spiral pleated filter element. After the diameter of the pleated filter element has been reduced by the spiraling assembly, the ram urges the filter element upward into the cylindrical cage until the filter element is fully enclosed therein. Thereafter, the completed filter assembly is removed from the apparatus by the operator.

Further features of the apparatus and method of the subject invention will become more readily apparent to those having ordinary skill in the art from the following description of the invention taken in conjunction with the drawings.

BRIEF DESCRIPTION OF THE DRAWINGS

So that those having ordinary skill in the art to which the subject invention appertains will more readily understand how to form a spiral pleated filter cartridge in accordance with the method of the subject invention, a preferred embodiment of the method and apparatus of the subject invention will be described in detail hereinbelow with reference to the drawings wherein.

DETAILED DESCRIPTION OF THE PREFERRED EMBODIMENTS

Figure 1:
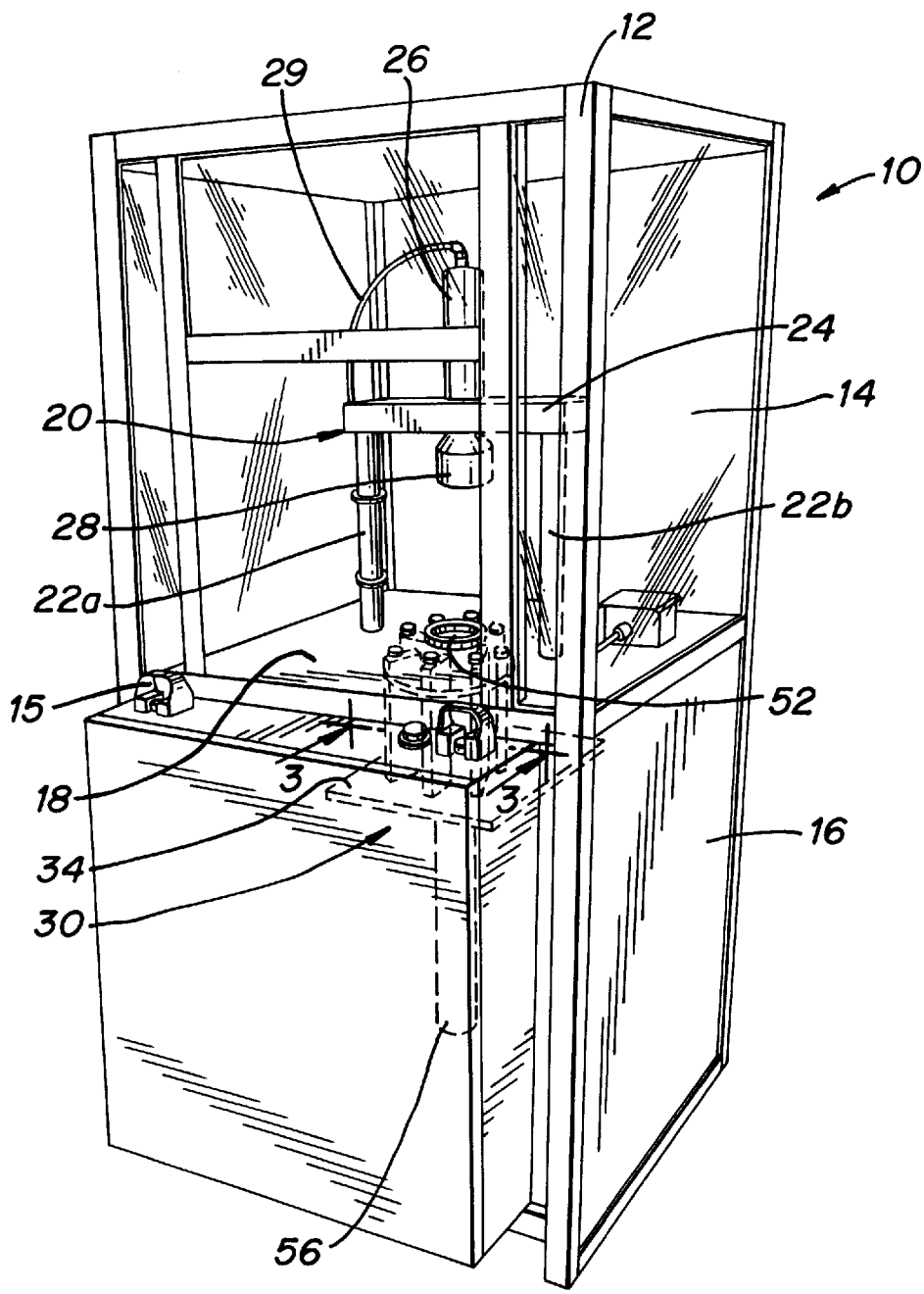
FIG. 1 is a perspective view of a spiral pleating apparatus constructed in accordance with a preferred embodiment of the subject invention.

Referring now to the drawings wherein like reference numerals identify similar structural elements of the subject invention, there is illustrated in FIG. 1 a spiral pleating apparatus constructed in accordance with a preferred embodiment of the subject invention and designated generally by reference numeral 10. In brief, spiral pleating apparatus 10 is adapted and configured to facilitate the automated formation of a spiral pleated filter cartridge having a plurality of laid-over longitudinal pleats from a cylindrical filter element having a plurality of radially extending longitudinal pleats.

Referring now in detail to FIG. 1, spiral pleating apparatus 10 includes an upstanding support frame 12 defining a substantially rectangular enclosure for housing the operative components of the system. Support frame 12, which is preferably constructed from aluminum tubing or the like, is divided into upper and lower sections 14 and 16 by an intermediate horizontal support deck 18. The upper section 14 is clad in plexiglass or a similar transparent material, to protect the operator from injury during a spiral pleating operation while enabling the operator to readily view the formation of the filter assembly. The lower section 16 is clad in light gauge aluminum or a similar sheet metal to isolate the working components of spiraling apparatus 10. It is envisioned that the upper section 14 may include a hinged panel to provide ready access into the interior of the apparatus. As illustrated in FIG. 1, an exterior portion of the horizontal support deck 18 defines a control panel having a set of electronic controls 15 which are used to operate the apparatus. These controls includes actuation switches, emergency stop switches and safety switches, among others.

Figure 2:
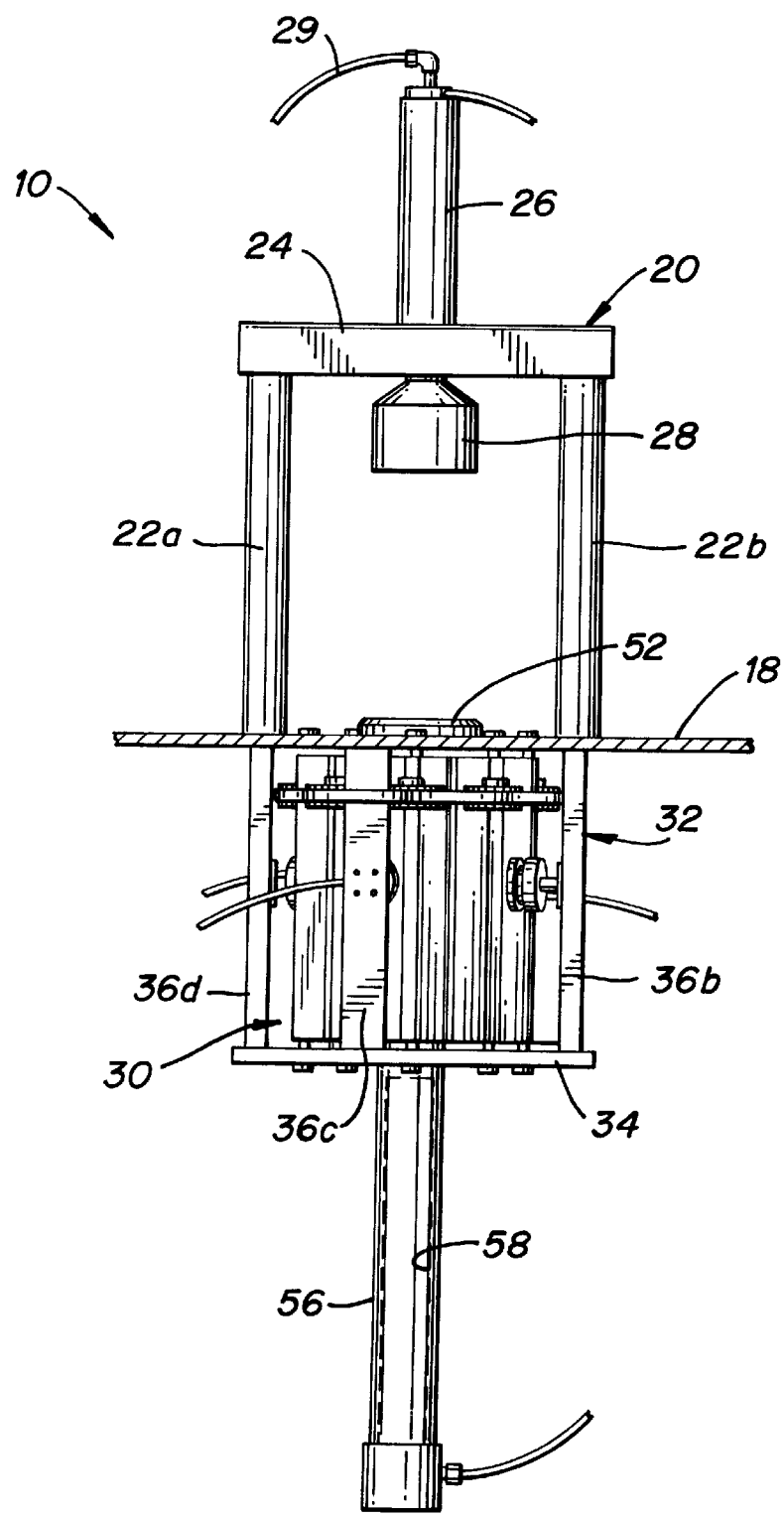
FIG. 2 is an elevational view of the spiral pleating assembly housed within the apparatus illustrated in FIG. 1.

Referring to FIG. 2, the upper section 14 of support frame 12 accommodates a support structure 20 defining a bridge having spaced apart upstanding pylons 22a and 22b, and a horizontal cross-beam 24. The cross-beam 24 supports a pneumatic cylinder 26 having a plunger 28 dimensioned and configured to engage and carry a cylindrical cage element which forms part of the filter assembly of the subject invention (see generally, FIG. 4). The structure and function of the cylindrical cage element will be described in greater detail hereinbelow. Cylinder 26 is connected to a pneumatic source by supply conduit 29 and is designed to effectuate vertical translation of the plunger 28 during operation. The lower section 16 of support frame 12 houses the spiraling assembly of apparatus 10 which is designated generally by reference numeral 30.

Figure 3:
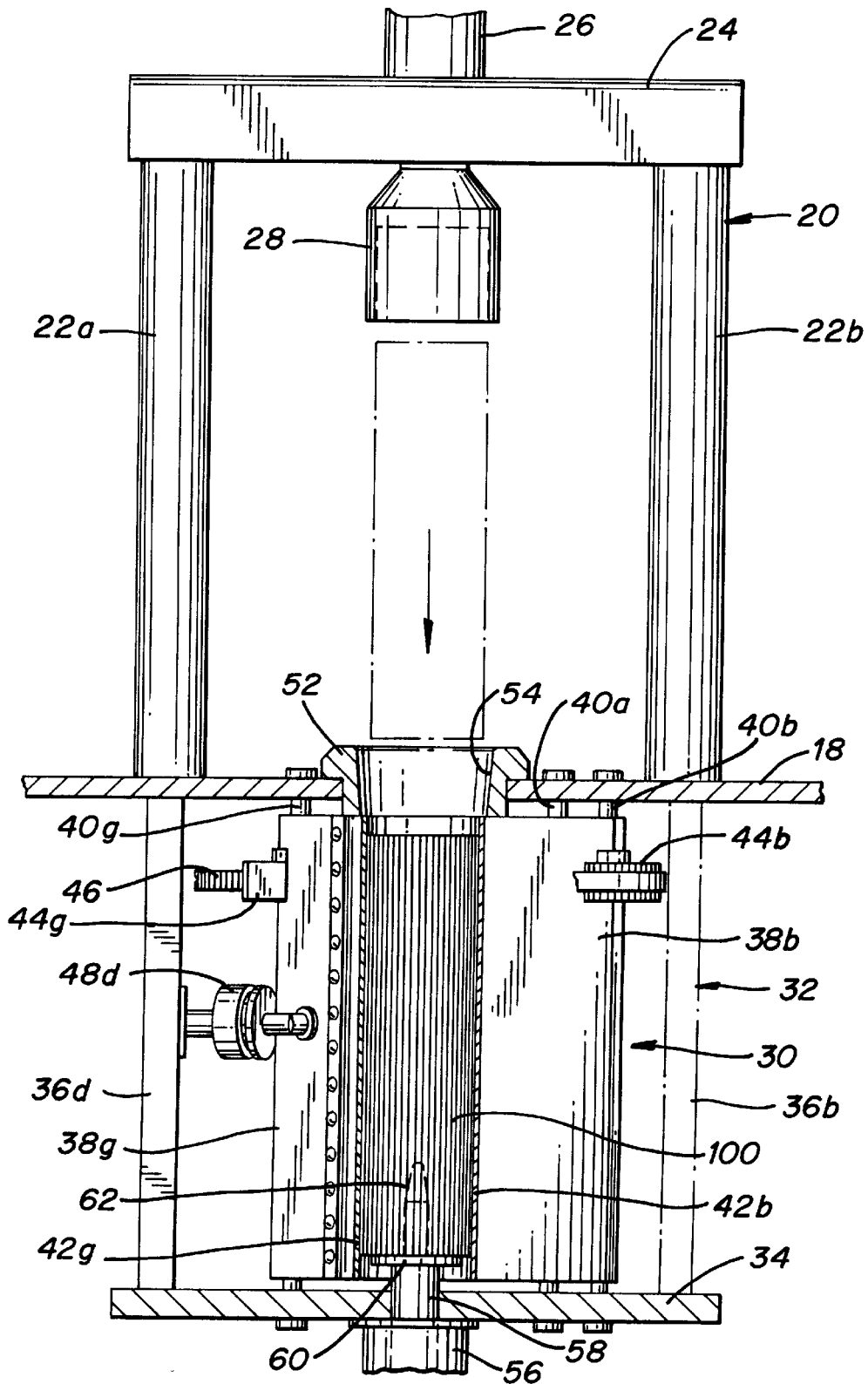
FIG. 3 is an enlarged elevational view taken along line 3—3 of FIG. 1 of the spiral pleating assembly illustrated in FIG. 2, with a pleated filter element disposed therein.

Referring to FIG. 3 in conjunction with FIG. 6, the spiraling assembly 30 of pleating apparatus 10 is accommodated within an undercarriage 32 mounted below support deck 18 and including a base plate 34 and four vertical struts 36a–36d. Spiraling assembly 30 includes eight circumferentially spaced apart elongated filter engagement members 38a–38h having respective pivot shafts 40a–40h associated therewith. The pivot shafts extend between the support deck 18 and base 34 and facilitate pivotal movement of the engagement members. Moreover, the pivot shafts define the longitudinal pivot axes of the elongated engagement members.

Elongated arcuate engagement flanges 42a–42h formed from a spring metal or a similar resilient material, are fastened to the radially inner ends of engagement members 38a–38h, respectively, by a plurality of conventional fasteners, such as, for example, rivets. The engagement flanges are dimensioned and configured to engage the outer periphery of a cylindrical filter cartridge 100 along a substantial portion of the length thereof. To effectively engage a substantial portion of the outer periphery of filter cartridge 100, engagement flanges 42a–42h are co-extensive with engagement members 38a–38h, as shown, for example, in FIG. 4. Semi-circular drive gears 44a–44h are fixedly mounted at the radially outer end of engagement members 38a–38h, respectively. The drive gears are connected to one another by a circular drive belt 46. The drive belt is preferably of the type formed from an elastomeric material which has a plurality of ribs on the radially inner surface thereof for meshing with the teeth of the plural drive gears.

Of the eight engagement members 38a–38h of spiraling assembly 30, engagement members 38a, 38c, 38e and 38g, hereinafter referred to as the four driving engagement members, are directly connected to pneumatic drive pistons 48a–48d, respectively. The drive pistons which are designed to impart a linear component of motion to the associated engagement members. However, since all of the engagement members are connected to one another by way of drive gears 44a–44h and drive belt 46, the linear component of motion imparted directly to engagement members 38a, 38c, 38e, and 38g is indirectly imparted to engagement members 38b, 38d, 38f and 38h, hence they are hereinafter referred to as the four driven engagement members. Furthermore, since each of the engagement members are mounted for pivotal movement about respective vertical axes, the linear motion imparted to the engagement members by the pneumatic pistons during a spiraling operation is translated into rotational or angular motion (see generally, FIG. 7).

Figure 6:
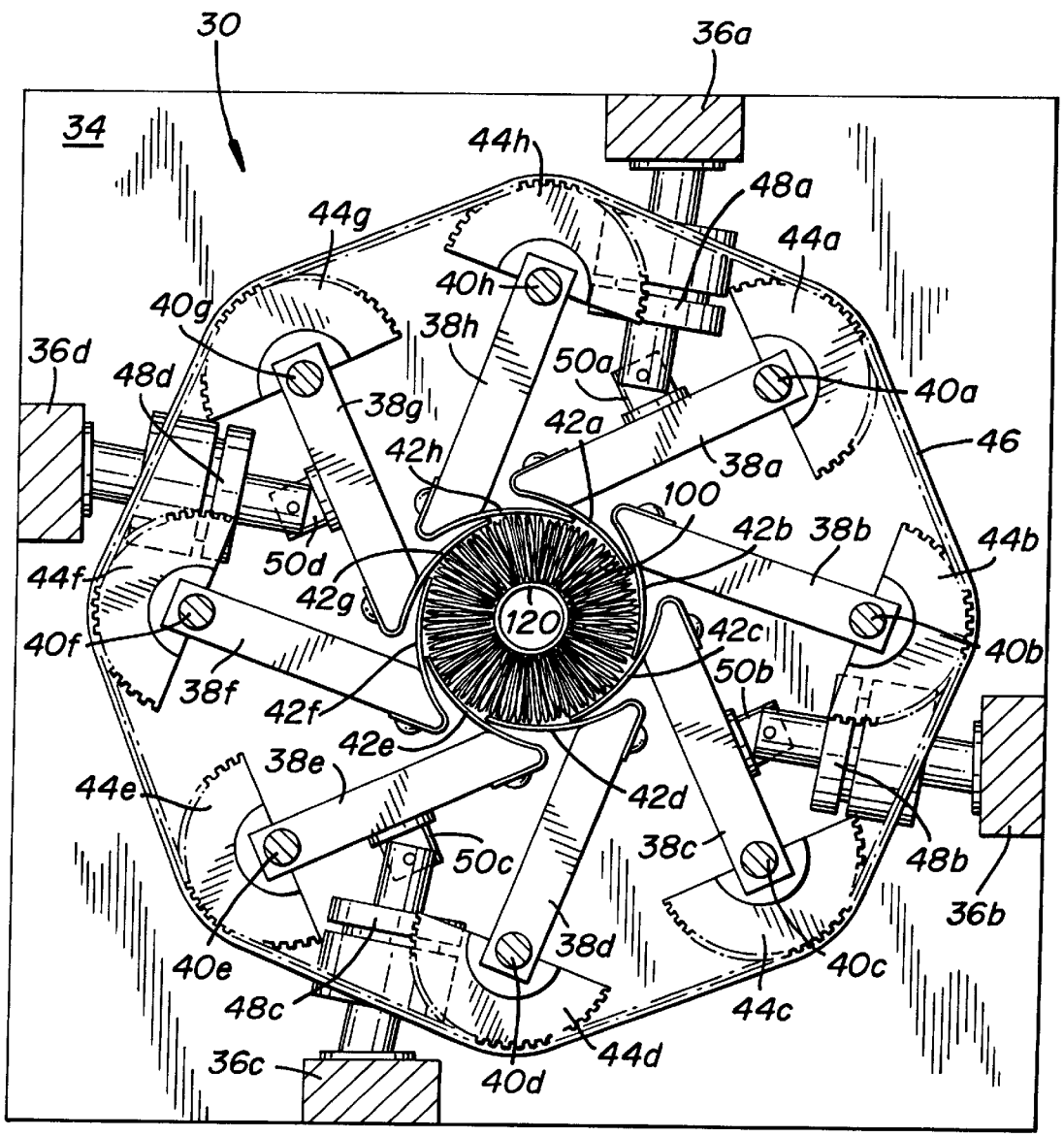
FIG. 6 is a plan view taken along line 6—6 of FIG. 5 illustrating the configuration of the pleats of the filter element when the pneumatically actuated engagement members of the spiral pleating assembly are disposed in a radially retracted position.

As best seen in FIG. 6, hydraulic pistons 48a–48d are respectively mounted on the vertical struts 36a–36d of undercarriage 32 and are pivotably connected to lateral flanges 50a–50d which project from the central body portions of the driving engagement members 38a, 38c, 38e and 38g, respectively. The pivot connection between the drive pistons and the engagement members facilitates the translation of linear motion into rotational motion when the pistons are actuated. As best seen in FIG. 2, supply conduits provide pneumatic fluid to each of the drive pistons from a reservoir. It is envisioned that other mechanisms or devices may be employed to impart linear motion to the four driving engagement members, such as, for example, hydraulic pistons, linear drive screw devices or the like.

Referring to FIGS. 2 and 3, a filter guide block 52 is mounted in support deck 18 and has an inwardly tapered reception bore 54 dimensioned and configured to guide a pleated filter cartridge 100 into the cylindrical staging area defined by the circumferentially disposed engagement members 38a–38h of spiraling apparatus 30. A vertical ram assembly 56 is disposed below the base plate 34 of undercarriage 32 and in axial alignment with filter guide block 52 and the plunger 28 of hydraulic piston 26. Ram assembly 56 includes a lift member 58 which extends through an aperture in base plate 34 and includes a circular flange 60 for supporting the bottom end of a pleated filter cartridge and a stem 62 for engaging the central bore of the filter cartridge while in the staging area of spiraling assembly 30. Ram 56 is adapted and configured to lift a spiral pleated filter cartridge out of the staging area of spiraling assembly 30 and drive it into a cylindrical cage element supported above the spiraling assembly by plunger 28 (see generally, FIG. 9). Preferably, vertical ram assembly 56 is defined by an electrically powered linear drive assembly or the like. However, it is envisioned that other mechanisms or devices may be employed to impart linear motion to lift member 58, such as, for example, an pneumatic or hydraulic device.

Referring to FIG. 3, in operation, a cylindrical filter cartridge 100 having a plurality of radially extending longitudinal pleats, a perforated cylindrical core element 120 (see FIG. 6), and an initial outer diameter of approximately 3.20 inches is manually inserted through the reception bore 54 of guide block 52 and into the cylindrical staging area defined by the plural engagement members of spiraling assembly 30. At such a time, the plural engagement members of spiraling assembly 30 are disposed in the radially retracted positions illustrated in FIG. 6, which will be discussed in greater detail hereinbelow with respect to FIG. 5.

Figure 4:
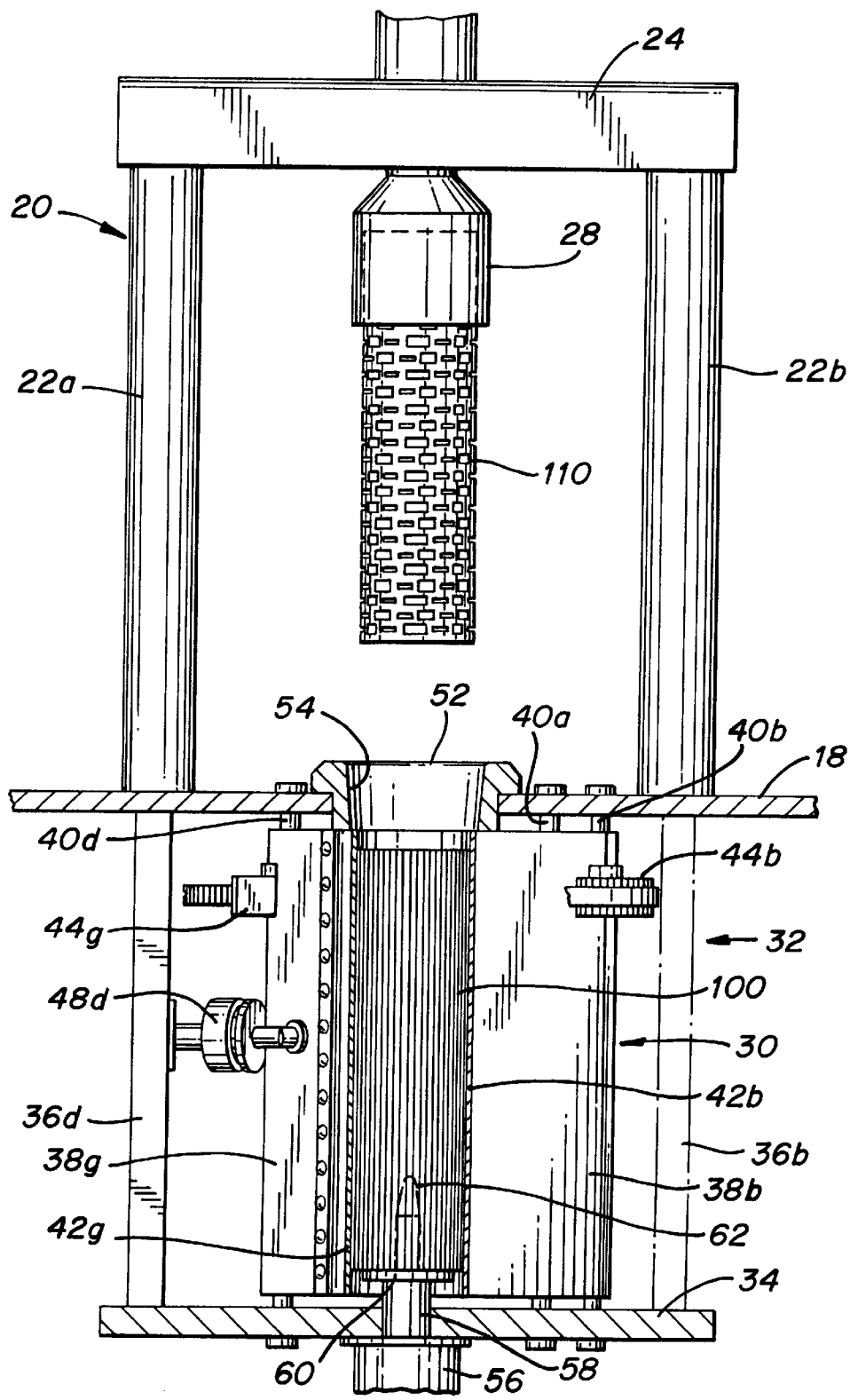
FIG. 4 is an elevational view as in FIG. 3 with a cylindrical cage element supported above the pleated filter element.

Referring to FIG. 4, after the filter cartridge 100 has been emplaced in spiraling assembly 30, the upper portion of a cylindrical cage element 110 is manually inserted into the plunger 28 of cylinder 26. The cage element is preferably formed from a thermoplastic material, such as, for example, polypropylene or a like material, is perforated to facilitate fluid flow through the filter assembly, and has an inner diameter which is substantially equal to the outer diameter of the filter cartridge 100 after the radially extending pleats of the filter cartridge have been moved into a laid-over spiraled configuration.

Figure 5:
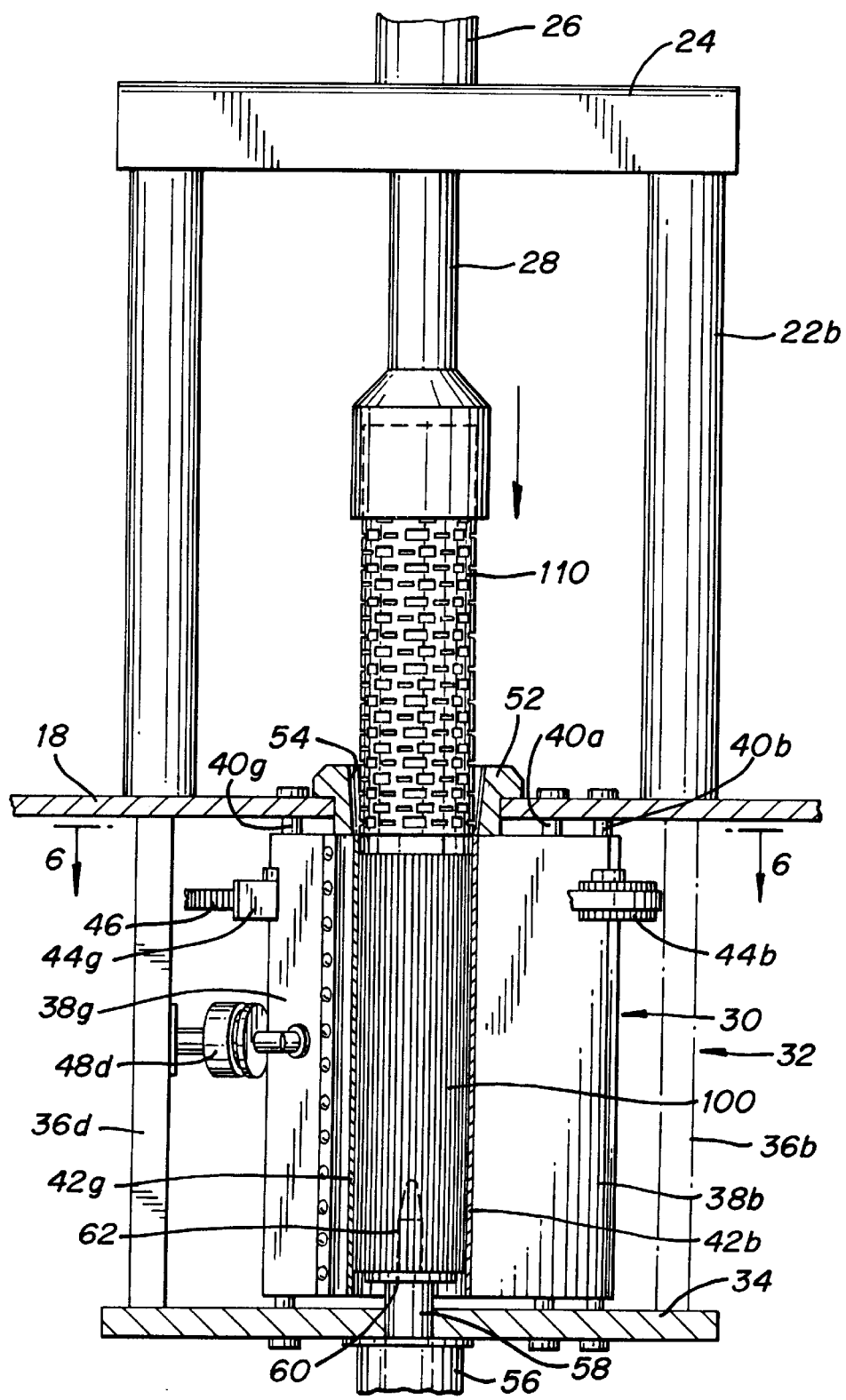
FIG. 5 is an elevational view as in FIG. 4 with the cylindrical cage element lowered into a position proximate the upper end of the pleated filter element.

Referring to FIG. 5, after cage element 110 has been emplaced in plunger 28, pneumatic cylinder 26 is remotely actuated so as to lower plunger 28 into an operative position, wherein the bottom portion of cage element 110 is disposed within the reception bore 54 of guide block 52, proximate the upper end of filter cartridge 100. As best seen in FIG. 6, at such a time, hydraulic pistons 48a–48d of spiraling assembly 30 are disposed in a retracted position, wherein the radially inner portions of engagement members 38a–38h are disposed in radially retracted positions. In such radially retracted positions, the resilient engagement flanges 42a–42h of engagement members 38a–38h surround and engage the outer periphery of filter cartridge 110 along the length thereof.

Figure 7:
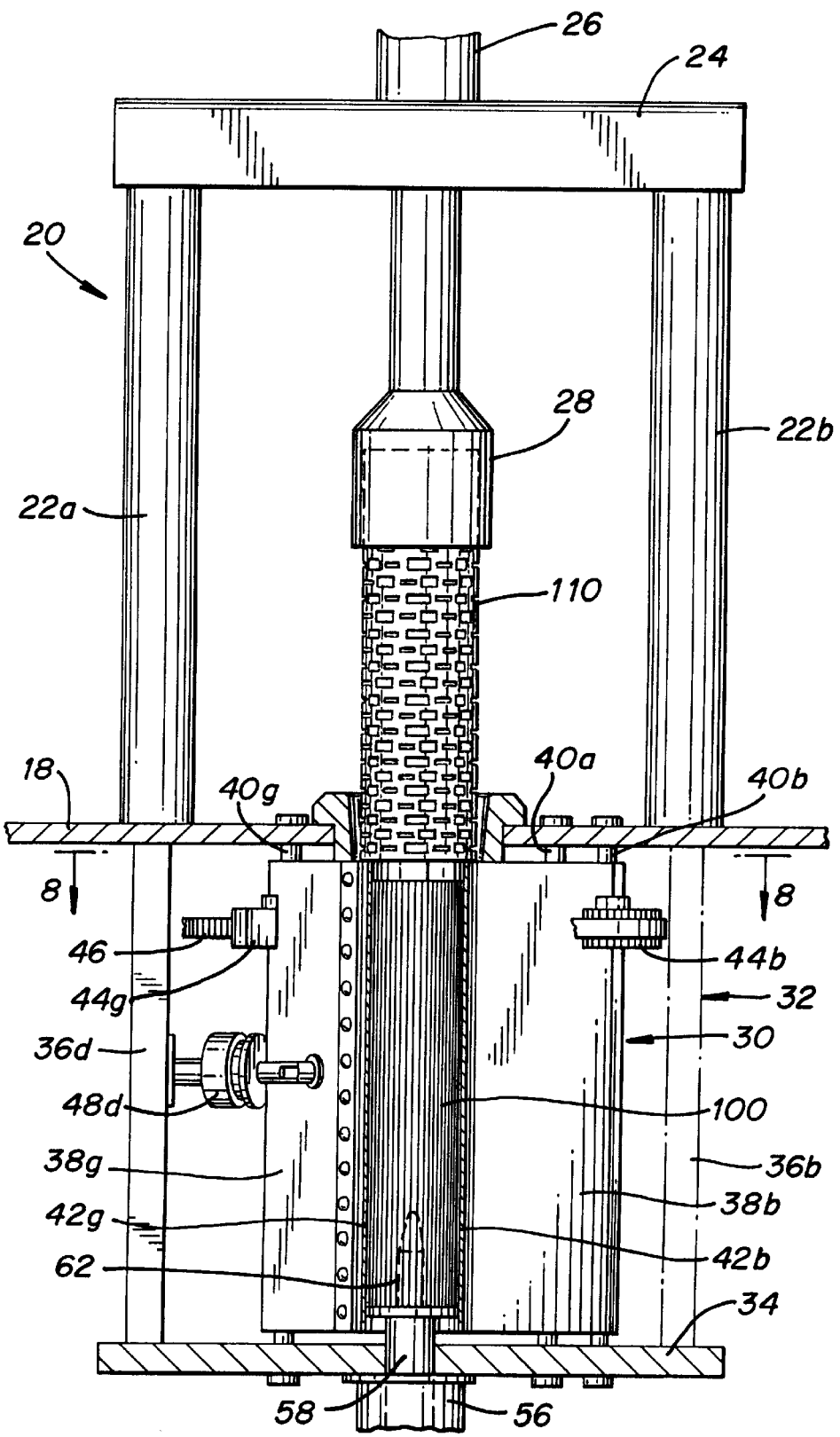
FIG. 7 is an elevational view as in FIG. 5 with pneumatically actuated engagement members of the spiraling assembly in a radially extended position.
Figure 8:
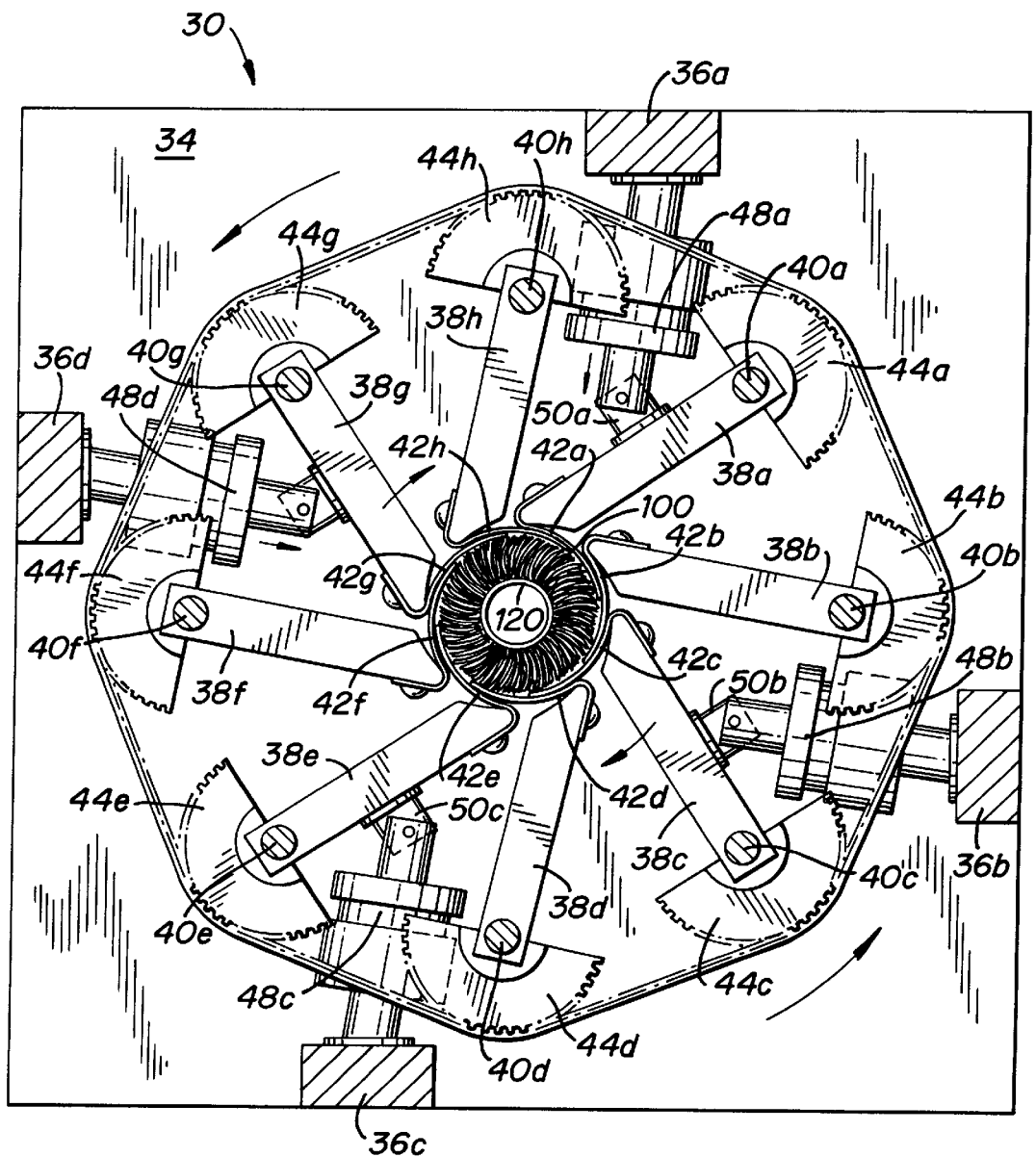
FIG. 8 is a plan view taken along line 8—8 of FIG. 7 illustrating the configuration of the pleats of the filter element when the engagement members of the spiral pleating assembly are moved radially inwardly to reduce the outer diameter of the filter element and urge the pleats into a laid-over spiraled configuration.

Referring to FIGS. 7 and 8, upon actuation of pneumatic pistons 48–48d, a linear component of motion is directly imparted to the four driving engagement members 38a, 38c, 38e and 38g, whereupon the four driving engagement members 38a, 38c, 38e and 38g rotate in a clockwise direction about the respective pivot axes thereof. Consequently, the semi-circular drive gears 44a, 44c, 44e and 44g associated with four driving engagement members 38a, 38c, 38e and 38g, respectively, rotate counter-clockwise, thereby causing drive belt 46 to translate counter-clockwise. As a result, drive belt 46 causes semi-circular drive gears 44b, 44d, 44f and 44h to rotate counter-clockwise, whereby the four driven engagement members 38b, 38d, 38f and 38h associated therewith rotate clockwise about the respective longitudinal axes thereof.

As a consequence of the concerted clockwise rotation of the eight engagement members 38a–38h about pivot shafts 40a–40h, respectively, the radially inner portions of the engagement members, and hence the engagement flanges 42a–42h fastened thereto, simultaneously translate in a radially inwardly curved involute path, acting in concert in a manner similar to an iris mechanism. Consequently, the radially extending pleats of filter cartridge 100 are simultaneously moved into a laid-over spiraled configuration along the entire length of the filter cartridge, wherein the outer diameter of the filter cartridge is reduced to approximately 2.50 inches.

Figure 9:
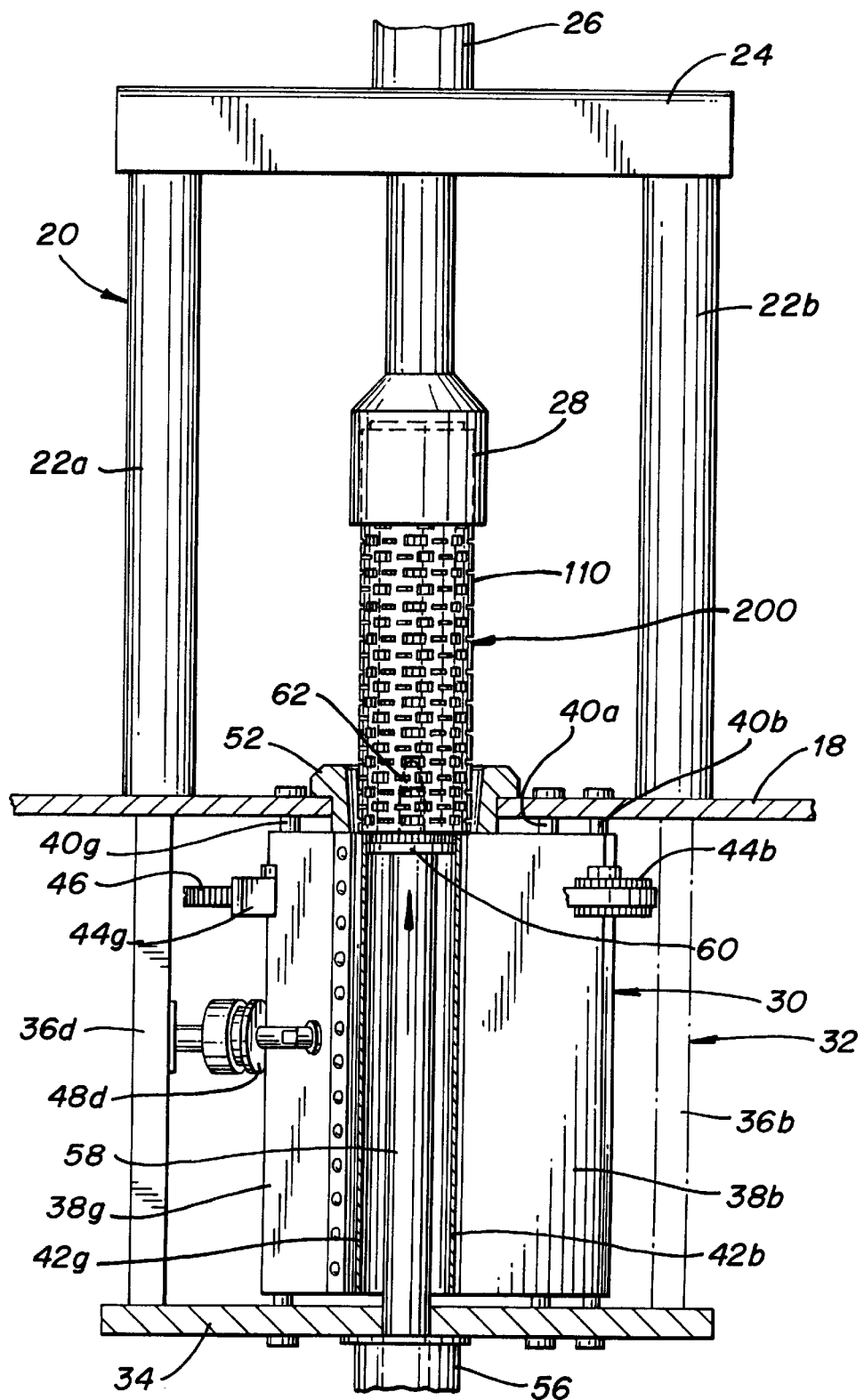
FIG. 9 is an elevational view as in FIG. 8 with the spiral pleated filter element driven into the cylindrical cage element by a vertical ram.
Figure 10:
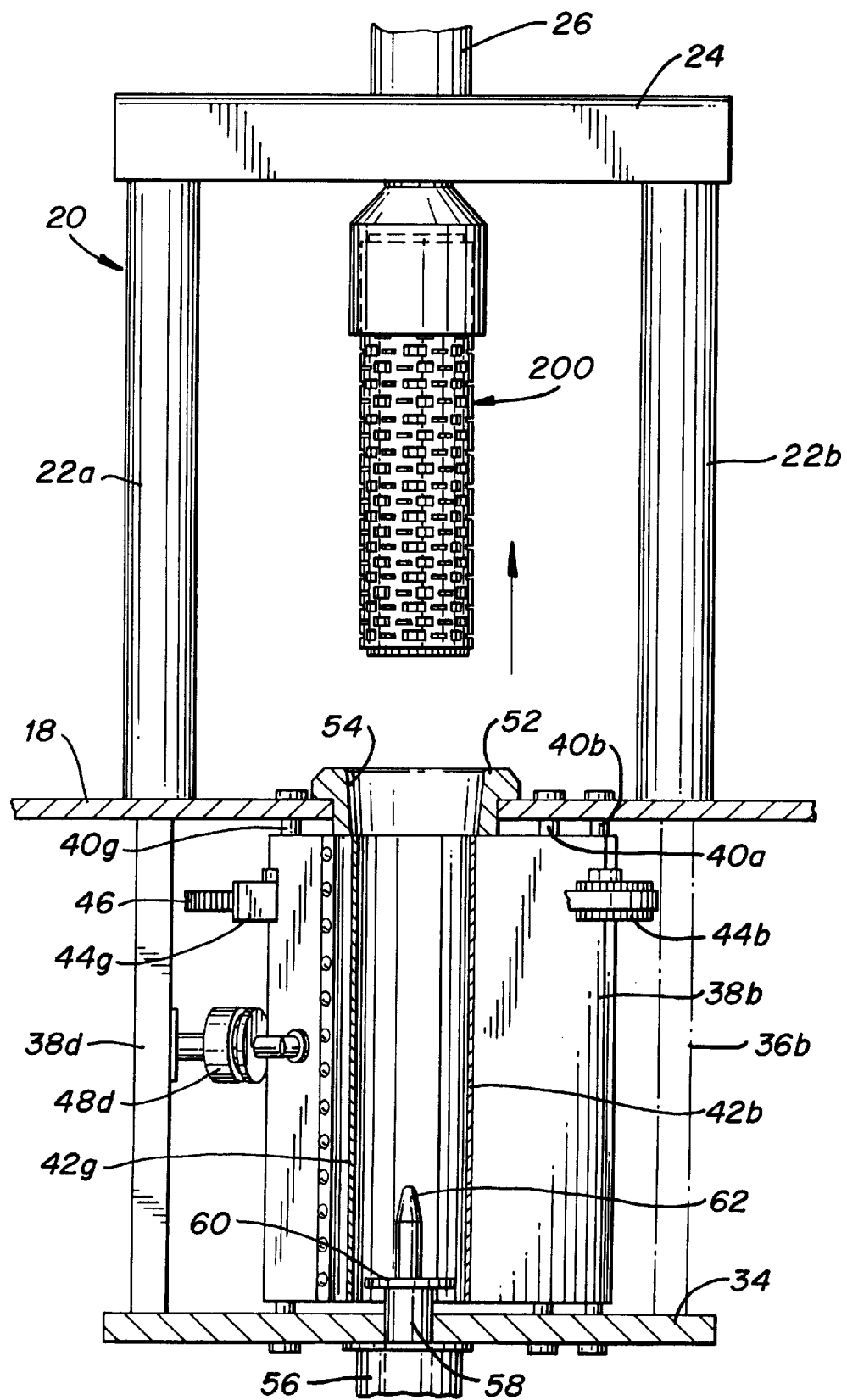
FIG. 10 is an elevational view as in FIG. 9 with the caged pleated filter element lifted above the spiral pleating assembly to facilitate ease of removal from the housing of the spiral pleating apparatus.

Referring to FIG. 9, after the outer diameter of filter cartridge 100 has been reduced by spiraling assembly 30, vertical ram assembly 56 is actuated, causing lift member 58 to drive the spiral pleated filter cartridge into the cylindrical cage 110 supported thereabove by plunger 28. Thereafter, as illustrated in FIG. 10, plunger 28 is retracted into cylinder 26, withdrawing the completed spiral pleated filter cartridge assembly from the reception bore 54 of guide block 52, and lift member 58 is retracted. At such a time, the completed spiral pleated filter cartridge assembly 200 may be removed from spiraling apparatus 10 by the operator.

Although the subject invention has been described and illustrated with respect to a preferred embodiment, it is apparent that modifications and changes can be made thereto without departing from the spirit and scope of the invention as defined by the appended claims. For example, while the spiraling assembly of the pleating apparatus of the subject invention is configured with four driving filter engagement members and four driven filter engagement members, it is envisioned that all eight of the filter engagement members can be independently driven by respective drive pistons. In such an instance, the connective belt would serve as a timing belt to synchronize the working elements of the spiraling assembly.

What is claimed is:

1. A method of forming a filter cartridge comprising the steps of:
   a) providing a cylindrical filter element having a plurality of radially extending longitudinal pleats and defining an outer periphery;
   b) simultaneously engaging the entire outer periphery of said cylindrical filter element along a substantial portion of the length of said plurality of radially extending longitudinal pleats; and
   c) simultaneously moving said plurality of radially extending longitudinal pleats into a laid-over spiraled configuration along the entire length of said cylindrical filter element to form a spiral pleated filter element.

2. A method according to claim 1, wherein said step of providing a cylindrical filter element includes the step of providing a cylindrical core element within said cylindrical filter element.

3. A method according to claim 1, wherein said step of engaging an outer periphery of said cylindrical filter element includes the step of maintaining said cylindrical filter element in a fixed longitudinal position.

4. A method according to claim 1, further comprising the step of positioning said spiral pleated filter element within a cylindrical cage element.

5. A method according to claim 4, wherein said step of positioning said spiral leated filter element within said cylindrical cage element includes the step of moving said piral pleated filter element relative to said cylindrical cage element.

6. A method of forming a filter cartridge comprising the steps of:
   a) providing a cylindrical filter element having a plurality of radially extending longitudinal pleats and defining an outer periphery with an initial outer diameter;
   b) simultaneously engaging the entire outer periphery of said cylindrical filter element along a substantial portion of the length of said plurality of radially extending longitudinal pleats; and
   c) simultaneously reducing the outer diameter of said cylindrical filter element along the entire length thereof.

7. A method according to claim 6, wherein said step of providing a cylindrical filter element includes the step of providing a cylindrical core element within said cylindrical filter element.

8. A method according to claim 6, wherein said step of providing a cylindrical filter element includes the step of providing a cylindrical filter element having a plurality of radially extending longitudinal pleats.

9. A method according to claim 6, wherein said step of engaging an outer periphery of said cylindrical filter element includes the step of maintaining said cylindrical filter element in a fixed longitudinal position.

10. A method according to claim 8, wherein said step of reducing the outer diameter of said cylindrical filter element along the entire length thereof includes the step of moving said plurality of radially extending longitudinal pleats into a laid-over spiraled configuration to form a spiral pleated filter element.

11. A method according to claim 10, further comprising the step of positioning said spiral pleated filter element within a cylindrical cage element.

12. A method according to claim 11, wherein said step of positioning said spiral pleated filter element within said cylindrical cage element includes the step of moving said spiral pleated filter element relative to said cylindrical cage element.

13. A method of forming a filter cartridge comprising the steps of:
   a) providing a cylindrical filter element having a plurality of radially extending longitudinal pleats and an initial outer diameter;
   b) engaging an outer periphery of said cylindrical filter element along a substantial portion of the length thereof with a plurality of circumferentially disposed elongated engagement members; and
   c) simultaneously moving said plurality of elongated engagement members in a radially inward circular direction so as urge said plurality of radially extending longitudinal pleats into a laid-over spiraled configuration and thereby reduce the outer diameter of said cylindrical filter element along the entire length thereof to form a spiral pleated filter element.

14. A method according to claim 13, wherein said step of providing a cylindrical filter element includes the step of providing a cylindrical core element within said cylindrical filter element.

15. A method according to claim 13, wherein said step of engaging an outer periphery of said cylindrical filter element includes the step of maintaining said cylindrical filter element in a fixed longitudinal position with respect to said plurality of elongated engagement members.

16. A method according to claim 13, further comprising the step of positioning said spiral pleated filter element within a cylindrical cage element.

17. A method according to claim 16, wherein said step of positioning said spiral pleated filter element within said cylindrical cage element includes the step of moving said spiral pleated filter element relative to said cylindrical cage element.

* * * * *